United States Patent
Chun

(10) Patent No.: US 12,022,384 B2
(45) Date of Patent: *Jun. 25, 2024

(54) METHOD FOR CONTROLLING ACCESS TO NETWORK IN WIRELESS COMMUNICATION SYSTEM AND DEVICE FOR SAME

(71) Applicant: LG ELECTRONICS INC., Seoul (KR)

(72) Inventor: Sungduck Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,629

(22) Filed: Jan. 7, 2022

(65) Prior Publication Data

US 2022/0182926 A1 Jun. 9, 2022

Related U.S. Application Data

(63) Continuation of application No. 16/251,765, filed on Jan. 18, 2019, now Pat. No. 11,252,647.

(Continued)

(51) Int. Cl.
*H04W 48/00* (2009.01)
*H04L 9/40* (2022.01)
(Continued)

(52) U.S. Cl.
CPC ........... *H04W 48/17* (2013.01); *H04L 63/102* (2013.01); *H04W 12/08* (2013.01); *H04W 48/02* (2013.01);
(Continued)

(58) Field of Classification Search
CPC .... H04L 63/102; H04W 80/02; H04W 12/08; H04W 74/0833; H04W 84/042;
(Continued)

(56) References Cited

U.S. PATENT DOCUMENTS

2007/0287419 A1 12/2007 Wang
2013/0053033 A1 2/2013 Jokinen
(Continued)

FOREIGN PATENT DOCUMENTS

CN 106471848 3/2017
CN 106664642 5/2017
(Continued)

OTHER PUBLICATIONS

3rd Generation Partnership Project; Technical Specification Group Service sand System Aspects, "Service requirements for the 5G system; Stage 1 (Release 16)," 3GPP TS 22.261, Dec. 2017, 53 pages.
(Continued)

*Primary Examiner* — Rasheed Gidado
(74) *Attorney, Agent, or Firm* — Fish & Richardson P.C.

(57) ABSTRACT

Disclosed as a method of controlling access to a network in a wireless communication system and an apparatus therefor. Specifically, a method of performing access to a network by a user equipment (UE) in a wireless communication system may include receiving first information on whether a specific access identity is valid in a specific public land mobile network (PLMN) from the network, when the UE selects a PLMN and attempts access, determining whether the specific access identity is valid in the PLMN selected by the UE based on the first information, selecting an access identity based on the determination, and performing an access control procedure based on the selected access identity.

12 Claims, 8 Drawing Sheets

Related U.S. Application Data

(60) Provisional application No. 62/619,118, filed on Jan. 19, 2018.

(51) Int. Cl.
| | | |
|---|---|---|
| *H04W 12/08* | (2021.01) | |
| *H04W 48/02* | (2009.01) | |
| *H04W 60/00* | (2009.01) | |
| *H04W 74/08* | (2009.01) | |
| *H04W 74/0833* | (2024.01) | |
| *H04W 76/11* | (2018.01) | |
| *H04W 80/02* | (2009.01) | |
| *H04W 88/02* | (2009.01) | |
| *H04W 84/04* | (2009.01) | |

(52) U.S. Cl.
CPC ....... *H04W 60/00* (2013.01); *H04W 74/0833* (2013.01); *H04W 76/11* (2018.02); *H04W 80/02* (2013.01); *H04W 88/023* (2013.01); *H04W 84/042* (2013.01)

(58) Field of Classification Search
CPC ... H04W 76/11; H04W 88/023; H04W 60/00; H04W 48/17; H04W 48/02
See application file for complete search history.

(56) References Cited

U.S. PATENT DOCUMENTS

| | | |
|---|---|---|
| 2013/0203414 A1 | 8/2013 | Zong |
| 2015/0126189 A1 | 5/2015 | Rao |
| 2016/0029298 A1 | 1/2016 | Bergstrom |
| 2016/0165530 A1 | 6/2016 | Sedlacek |
| 2016/0183169 A1* | 6/2016 | Horn ................ H04L 69/08 |
| | | 709/225 |
| 2016/0219503 A1 | 7/2016 | Kim |
| 2016/0353361 A1* | 12/2016 | Jung ................ H04W 40/00 |
| 2019/0045577 A1 | 2/2019 | Kim |
| 2019/0159115 A1* | 5/2019 | Russell ............. H04L 65/1073 |
| 2019/0174395 A1 | 6/2019 | Choe |

FOREIGN PATENT DOCUMENTS

| | | |
|---|---|---|
| KR | 1020150136805 | 12/2015 |
| KR | 1020170096121 | 8/2017 |
| WO | WO2013141656 | 9/2013 |
| WO | WO2015009070 | 1/2015 |
| WO | WO2015119472 | 8/2015 |

OTHER PUBLICATIONS

Ericsson, "Establishment causes for NR," R2-1800321, 3GPP TSG-RAN WG2 NR AH#3, Vancouver, Canada, Jan. 22-26, 2018, 10 pages.

Extended European Search Report in European Appln. No. 19741096.2, dated Oct. 19, 2020, 9 pages.

NTT DOCOMO Inc. et al., "Clarification of unified access control requirements," S1-174619 (revision of S1-174608), Change Request, Presented at 3GPP TSG-SA WG1 Meeting #80, Reno, Nevada, USA, Nov. 27-Dec. 1, 2017, 4 pages.

Office Action in Chinese Appln No. 201980009063.4, dated Nov. 29, 2021 16 pages (with English Translation).

Qualcomm Incorporated, "Cell Barring and Reservations for NR," R2-1713799 (resubmission R2-1710805), Presented at 3GPP TSG-RAN2 Meeting #100, Reno, NV, USA, Nov. 27-Dec. 1, 2017, 3 pages.

Qualcomm Incorporated, "Cell Barring and Reservations for NR," R2-1800104 (resubmission R2-1713799), Presented at 3GPP TSG-RAN2 NR AH #0118, Vancouver, Canada, Jan. 22-26, 2018, 5 pages.

* cited by examiner

METHOD FOR CONTROLLING ACCESS TO NETWORK IN WIRELESS COMMUNICATION SYSTEM AND DEVICE FOR SAME

CROSS-REFERENCE TO RELATED APPLICATIONS

This application is a continuation of U.S. application Ser. No. 16/251,765, filed on Jan. 18, 2019, which claims the benefit of U.S. Provisional Application No. 62/619,118, filed on Jan. 19, 2018. The contents of these applications are hereby incorporated by reference in their entirety.

BACKGROUND OF THE INVENTION

The present invention relates to a wireless communication system and, more particularly, to a method of controlling access to a network by a user equipment (UE) and an apparatus supporting the same.

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting a super-wide band, and device networking, have been researched.

SUMMARY OF THE INVENTION

The present invention proposes a method of controlling access to a network by a UE in a wireless communication system.

Furthermore, the present invention proposes a method of controlling access to a corresponding network when a UE moves to a different country or when a UE accesses a service network different from its own subscription network.

Technical objects to be achieved in the present invention are not limited to the aforementioned object, and those skilled in the art to which the present invention pertains may evidently understand other technological objects from the following description.

In an aspect of the present invention, a method of performing access to a network by a user equipment (UE) in a wireless communication system may include receiving first information on whether a specific access identity is valid in a specific public land mobile network (PLMN) from the network, when the UE selects a PLMN and attempts access, determining whether the specific access identity is valid in the PLMN selected by the UE based on the first information, selecting an access identity based on the determination, and performing an access control procedure based on the selected access identity.

In another aspect of the present invention, a user equipment (UE) performing access to a network in a wireless communication system includes a transceiver configured to transmit and receive radio signals and processor configured to control the transceiver. The processor may be configured to receive first information on whether a specific access identity is valid in a specific public land mobile network (PLMN) from the network, when the UE selects a PLMN and attempts access, determine whether the specific access identity is valid in the PLMN selected by the UE based on the first information, select an access identity based on the determination, and perform an access control procedure based on the selected access identity.

Whether a specific access identity is valid in the PLMN selected by the UE may be determined based on the first information unless second information different from the first information on whether the specific access identity is valid in a specific PLMN is received.

When the specific access identity is valid in the PLMN selected by the UE, the specific access identity may be selectable.

When the UE is configured for a multimedia priority service (MPS) and an access identity for the MPS is valid in the PLMN selected by the UE, the access identity for the MPS may be selectable.

When the UE is configured for a mission critical service (MCS) and an access identity for the MCS is valid in the PLMN selected by the UE, the access identity for the MCS may be selectable.

When the specific access identity is not valid in the PLMN selected by the UE, an access identity other than the specific access identity may be selectable.

In receiving system information from the network, the system information may include information on one or more PLMNs available within a cell. The selected PLMN may be selected within the available one or more PLMNs.

The method may further include transmitting, to the network, a message related to an attach request, and receiving, from the network, a message related to an acceptance of the attach request. The message related to the acceptance of the attach request may include the first information.

In accordance with an embodiment of the present invention, when a UE moves to a different country or when a UE accesses a service network different from its own subscription network, the UE can control radio resource congestion using a priority access method configured therefor, and can also support the uniform operation characteristics of UEs.

Furthermore, in accordance with an embodiment of the present invention, an access opportunity for a wireless network can be provided to a UE supporting frequency bands having different characteristics by effectively controlling the access of the UE to the network.

Effects which may be obtained in the present invention are not limited to the aforementioned effects, and various other effects may be evidently understood by those skilled in the art to which the present invention pertains from the following description.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

DESCRIPTION OF EXEMPLARY EMBODIMENTS

Figure 1:
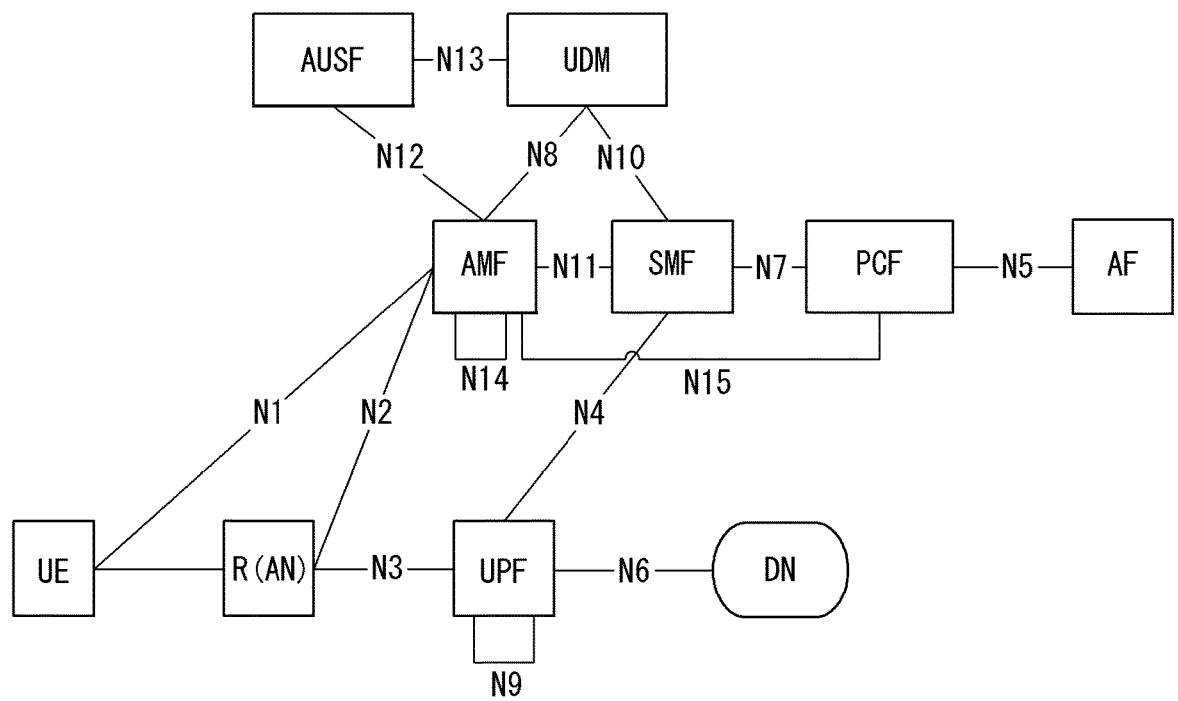
FIG. 1 illustrates a wireless communication system architecture to which the present invention may be applied.

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP 5G (5 Generation) system, but the technical features of the present invention are not limited to the current descriptions.

Terms used in this document are defined as follows.

Evolved Packet System (EPS): a network system including an Evolved Packet Core (EPC), that is an Internet Protocol (IP) based packet switched core network, and an access network such as LTE and UTRAN. The EPS is a network of an evolved version of a Universal Mobile Telecommunications System (UMTS).

eNodeB: a base station of an EPS network. The eNodeB is installed outdoor, and its coverage has a scale of a macro cell.

International Mobile Subscriber Identity (IMSI): an internationally unique subscriber identity allocated in a mobile communication network.

Public Land Mobile Network (PLMN): a network configured for the purpose of providing mobile communication services to individuals. The PLMN can be configured for each operator.

5G system (5GS): a system composed of a 5G Access Network (AN), a 5G core network and a User Equipment (UE).

5G Access Network (5G-AN) (or AN): an access network composed of a New Generation Radio Access Network (NG-RAN) and/or a non-3GPP Access Network (AN) connected to the 5G core network.

New Generation Radio Access Network (NG-RAN) (or RAN): a Radio Access Network having a common feature of being connected to 5GC and supporting one or more of the following options:

1) Standalone New Radio.
2) New radio that is an anchor supporting E-UTRA extension.
3) Standalone E-UTRA (for example, eNodeB).
4) Anchor supporting new radio extension 5G Core Network (5GC): a core network connected to a 5G access network.

Network Function (NF): means a processing function adopted in 3GPP within a network or defined in 3GPP. The processing function includes a defined functional behavior and an interface defined in 3GPP.

NF service: a function exposed by the NF via a service-based interface and consumed by other authenticated NF(s).

Network Slice: a logical network that provides specific network capability(s) and network feature(s).

Network Slice instance: a set of NF instance(s) and required resources(s) (e.g., compute, storage, and networking resources) that form a deployed network slice.

Protocol Data Unit (PDU) Connectivity Service: service providing the exchange of PDU(s) between the UE and a data network.

PDU Connectivity Service: service providing the exchange of PDU(s) between the UE and a data network.

PDU Session: association between the UE and the data network providing the PDU Connectivity Service. An association type may be Internet Protocol (IP), Ethernet, or unstructured.

Non-Access Stratum (NAS): a functional layer for transceiving signaling and a traffic message between the UE and the core network in EPS and 5GS protocol stack. The NAS mainly functions to support mobility of the UE and support a session management procedure.

5G system architecture to which the present invention may be applied

A 5-generation (G) system is a technology evolved from the 4-G LTE mobile communication technology and is the evolution of the existing mobile communication network structure or a new radio access technology (RAT) through a clean-state structure and an extended technology of long term evolution (LTE). The 5G system supports extended LTE (eLTE), non-3GPP (e.g., wireless local access network (WLAN) access, and so on.

A 5G system architecture is defined to support data connections and services so that deployment thereof can use technologies, such as network function virtualization and software-defined networking. In the 5G system architecture, service-based interactions are used between control plane (CP) network functions (NFs).

FIG. 1 illustrates a wireless communication system architecture to which the present invention may be applied.

The 5G system architecture may include various elements (i.e., network function (NF)). FIG. 1 illustrates elements corresponding to some of the various elements.

An access and mobility management function (AMF) supports functions, such as signaling between CN nodes for mobility between 3GPP access networks, the termination of a radio access network (RAN) CP interface N2, the termination N1 of NAS signaling, registration management (e.g., registration area management), idle mode UE reachability, network slicing, and SMF selection.

Some or all of the functions of the AMF may be supported within one instance of a single AMF.

A data network (DN) means an operator service, Internet access or a 3rd party service, for example. The DN transmits a downlink protocol data unit (PDU) to a user plane function (UPF) or receives a PDU transmitted by a UE.

A policy control function (PCF) provides a function of receiving information on a packet flow from an application server and determining a policy such as mobility management or session management.

A session management function (SMF) provides a session management function and may be managed by a different SMF for each session when a UE has multiple sessions.

Some or all of the functions of the SMF may be supported within one instance of a single SMF.

Unified data management (UDM) stores a user's subscription data, policy data, and so on.

A user plane function (UPF) delivers a downlink PDU, received from a DN, to a UE over a (radio) access network ((R)AN), and delivers an uplink PDU, received from a UE, to a DN over an (R)AN.

An application function (AF) interacts with a 3GPP core network for service provision (e.g., support functions, such as an application influence on traffic routing, network capability exposure access, and an interaction with a policy framework for policy control).

A (radio) access network ((R)AN) collectively refers to a new radio access network that supports both evolved E-UTRA, that is, the evolved version of the 4G radio access technology, and a new radio (NR) (e.g., gNB).

A gNB supports functions for radio resource management (i.e., radio bearer control, radio admission control, connection mobility control, and the dynamic allocation (i.e., scheduling) of resources to a UE in the uplink/downlink).

A user equipment (UE) means a user device.

In the 3GPP system, a conceptual link connecting NFs within the 5G system is defined as a reference point.

N1 (or NG1) means a reference point between a UE and the AMF, N2 (or NG2) means a reference point between the (R)AN and the AMF, N3 (or NG3) means a reference point between the (R)AN and the UPF, N4 (or NG4) means a reference point between the SMF and the UPF, N5 (or NG5) means a reference point between the PCF and the AF, N6 (or NG6) means a reference point between the UPF and the data network, N7 (or NG7) means a reference point between the SMF and the PCF, N24 (or NG24) means a reference point between a PCF within a visited network and a PCF within a home network, N8 (or NG8) means a reference point between the UDM and the AMF, N9 (or NG9) means a reference point between two core UPFs, N10 (or NG10) means a reference point between the UDM and the SMF, N11 (or NG11) means a reference point between the AMF and the SMF, N12 (or NG12) means a reference point between the AMF and the AUSF, N13 (or NG13) means a reference point between the UDM and an authentication server function (AUSF), N14 (or NG14) means a reference point between two AMFs, and N15 (or NG15) means a reference point between the PCF and the AMF in the case of a non-roaming scenario and means a reference point between a PCF within a visited network and the AMF in the case of a roaming scenario.

FIG. 1 illustrates a reference model of a case where a UE accesses one DN using one PDU session, for convenience of description, but the present invention is not limited thereto.

Figure 2B:
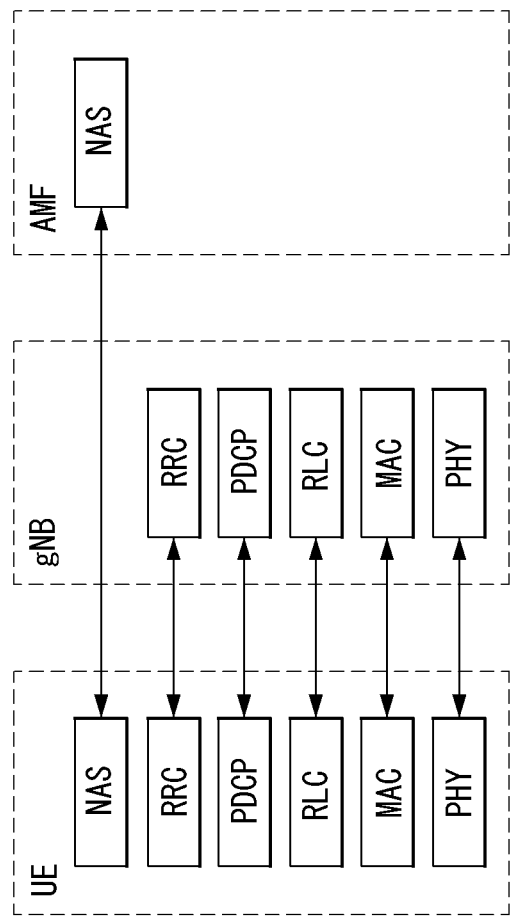
FIGS. 2A and 2B are diagrams illustrating a radio protocol stack in a wireless communication system to which the present invention may be applied.
Figure 2A:
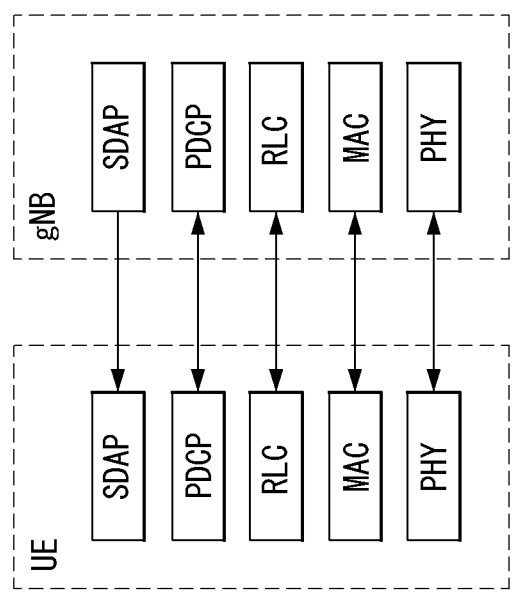

FIGS. 2A and 2B illustrate a wireless protocol stack in a wireless communication system to which the present invention is applicable.

FIG. 2A illustrates a radio interface user plane protocol stack between a UE and gNB, and FIG. 2B illustrates a radio interface control plane protocol stack between the UE and the gNB.

The control plane means a path through which control messages used for a UE and a network to manage calls are transmitted. The user plane means a path through which data generated in an application layer, for example, voice data, Internet packet data, and so on are transmitted.

Referring to FIG. 2A, the user plane protocol stack may be divided into Layer 1 (i.e., physical (PHY) layer) and Layer 2.

Referring to FIG. 2B, the control plane protocol stack may be divided into Layer 1 (i.e., PHY layer), Layer 2, Layer 3 (i.e., radio resource control (RRC) layer), and a Non-Access Stratum (NAS) layer.

The Layer 2 is divided into a Medium Access Control (MAC) sublayer, a Radio Link Control (RLC) sublayer, a Packet Data Convergence Protocol (PDCP) sublayer, and a Service Data Adaptation Protocol (SDAP) sublayer (in case of the user plane).

A radio bearer is classified into two groups: data radio bearer (DRB) for user plane data and signaling radio bearer (SRB) for control plane data.

Each layer of the control plane and the user plane of the radio protocol is described below.

1) The Layer 1, i.e., the PHY layer, provides information transfer service to an upper layer by using a physical channel. The PHY layer is connected to the MAC sublayer located at an upper level through a transport channel, and data are transmitted between the MAC sublayer and the PHY layer through the transport channel. The transport channel is classified according to how and which feature data is transmitted via a radio interface. And, data is transmitted between different PHY layers, between a PHY layer of a transmitter and a PHY layer of a receiver, through a physical channel.

2) The MAC sublayer performs mapping between a logical channel and a transport channel; multiplexing/de-multiplexing of MAC Service Data Unit (SDU) belonging to one or different logical channel(s) to/from a transport block (TB) delivered to/from the PHY layer through a transport channel; scheduling information reporting; error correction through hybrid automatic repeat request (HARM); priority handling between UEs using dynamic scheduling; priority handling between logical channels of one UE using logical channel priority; and padding.

Different kinds of data deliver a service provided by the MAC sublayer. Each logical channel type defines what type of information is delivered.

The logical channel is classified into two groups: a Control Channel and a Traffic Channel.

i) The Control Channel is used to deliver only control plane information and is as follows.

Broadcast Control Channel (BCCH): a downlink channel for broadcasting system control information.

Paging Control Channel (PCCH): a downlink channel that delivers paging information and system information change notification.

Common Control Channel (CCCH): a channel for transmitting control information between a UE and a network. This channel is used for UEs having no RRC connection with the network.

Dedicated Control Channel (DCCH): a point-to-point bi-directional channel for transmitting dedicated control information between the UE and the network. This channel is used by the UE having an RRC connection.

ii) The Traffic Channel is used to use only user plane information.

Dedicated Traffic Channel (DTCH): a point-to-point channel, dedicated to a single UE, for delivering user information. The DTCH may exist in both uplink and downlink.

In the downlink, connection between the logical channel and the transport channel is as follows.

The BCCH may be mapped to BCH. The BCCH may be mapped to DL-SCH. The PCCH may be mapped to PCH. The CCCH may be mapped to the DL-SCH. The DCCH may be mapped to the DL-SCH. The DTCH may be mapped to the DL-SCH.

In the uplink, connection between the logical channel and the transport channel is as follows. The CCCH may be mapped to UL-SCH. The DCCH may be mapped to the UL-SCH. The DTCH may be mapped to the UL-SCH.

3) The RLC sublayer supports three transmission modes: a Transparent Mode (TM), an Unacknowledged Mode (UM), and an Acknowledged Mode (AM).

The RLC configuration may be applied for each logical channel. In case of SRB, the TM or the AM is used. On the other hand, in case of DRB, the UM the AM is used.

The RLC sublayer performs the delivery of the upper layer PDU; sequence numbering independent of PDCP; error correction through automatic repeat request (ARQ); segmentation and re-segmentation; reassembly of SDU; RLC SDU discard; and RLC re-establishment.

4) A PDCP sublayer for the user plane performs Sequence Numbering; header compression and decompression (Robust Header Compression (RoHC) only); delivery of user data; reordering and duplicate detection (if the delivery to a layer above the PDCP is required); PDCP PDU routing (in case of a split bearer); re-transmission of PDCP SDU; ciphering and deciphering; PDCP SDU discard; PDCP re-establishment and data recovery for RLC AM; and duplication of PDCP PDU.

The PDCP sublayer for the control plane additionally performs Sequence Numbering; ciphering, deciphering and integrity protection; delivery of control plane data; duplicate detection; and duplication of PDCP PDU.

When duplication is configured for a radio bearer by RRC, an additional RLC entity and an additional logical channel are added to the radio bearer to control the duplicated PDCP PDU(s). The duplication at PDCP includes transmitting the same PDCP PDUs twice. Once it is transmitted to the original RLC entity, and a second time it is transmitted to the additional RLC entity. In this instance, the original PDCP PDU and the corresponding duplicate are not transmitted to the same transport block. Two different logical channels may belong to the same MAC entity (in case of CA) or different MAC entities (in case of DC). In the former case, logical channel mapping restriction is used to ensure that the original PDCP PDU and the corresponding duplicate are not transmitted to the same transport block.

5) The SDAP sublayer performs i) mapping between QoS flow and data radio bearer, and ii) QoS flow identification (ID) marking in downlink and uplink packet.

A single protocol entity of SDAP is configured for each individual PDU session, but exceptionally, in case of dual Connectivity (DC), two SDAP entities can be configured.

6) An RRC sublayer performs broadcast of system information related to Access Stratum (AS) and Non-Access Stratum (NAS); paging initiated by 5GC or NG-RAN; establishment, maintenance and release of RRC connection between UE and NG-RAN (additionally including modification and release of carrier aggregation and also additionally including modification and release of Dual Connectivity between E-UTRAN and NR or in NR); security function including key management; establishment, configuration, maintenance and release of SRB(s) and DRB(s); delivery of handover and context; UE cell selection and re-release and control of cell selection/reselection: mobility function including inter-RAT mobility; QoS management function, UE measurement reporting and control of reporting; detection of radio link failure and recovery from radio link failure; and NAS message delivery from NAS to UE and NAS message delivery from UE to NAS.

Random Access Procedure

A random access procedure provided by the LTE/LTE-A system is described below.

A random access procedure is performed when a UE performs initial access in the RRC idle state without an RRC connection with a base station or when a UE performs an RRC connection re-establishment procedure.

The LTE/LTE-A system provides both a contention-based random access procedure for a UE to randomly select and use one preamble within a specific set and a non-contention-based random access procedure for a specific UE to use a random access preamble allocated to the UE by a base station, in a process of selecting a random access preamble (RACH preamble).

Figure 3:
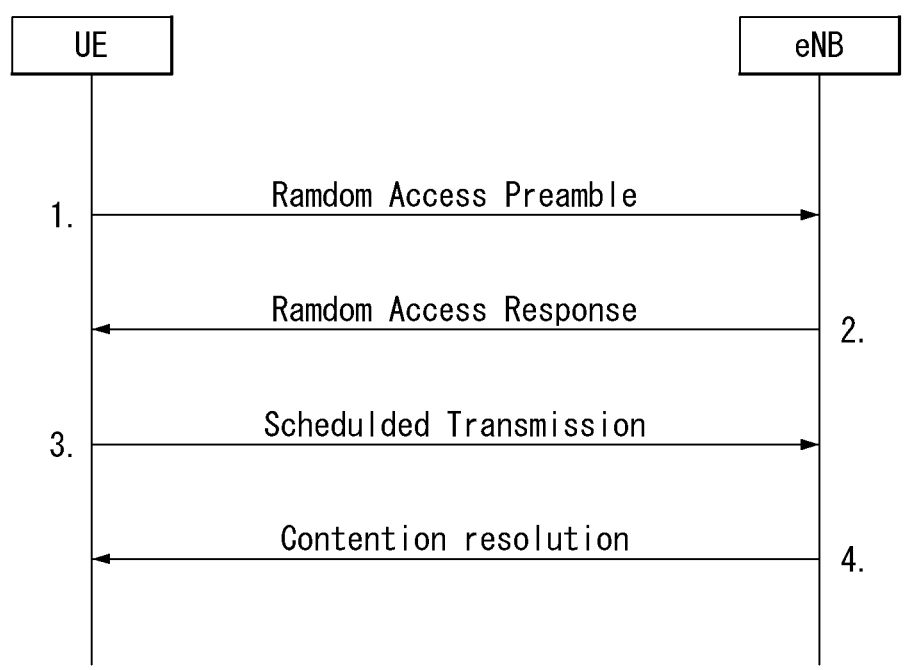
FIG. 3 is a diagram for illustrating a contention-based random access procedure in a wireless communication system to which the present invention may be applied.

FIG. 3 is a diagram for illustrating a contention-based random access procedure in a wireless communication system to which the present invention may be applied.

(1) First Message (Msg 1, Message 1)

First, a UE randomly selects one random access preamble (RACH preamble) in a set of random access preambles indicated through system information or a handover command, selects a physical RACH (PRACH) resource through which the random access preamble may be transmitted, and transmits the resource.

An eNB that has received the random access preamble from the UE decodes the preamble and obtains an RA-RNTI. The RA-RNTI related to the PRACH through which the random access preamble has been transmitted is determined based on the time-frequency resource of the random access preamble transmitted by the UE.

(2) Second Message (Msg 2, Message 2)

The eNB transmits, to the UE, a random access response addressed by the RA-RNTI obtained through the preamble on the first message. The random access response may include a random access (RA) preamble index/identifier, an uplink (UL) grant providing notification of an uplink radio resource, a temporary cell RNTI (TC-RNTI) and a time alignment command (TAC). The TAC is information indicating a time sync value transmitted from the eNB to the UE in order to maintain uplink time alignment. The UE updates uplink transmission timing using the time sync value. When the UE updates the time sync, it starts or restarts a time sync timer. The UL grant includes uplink resource allocation and transmit power command (TPC) used for the transmission of a scheduling message (third message) to be described later. The TPC is used to determine transmit power for a scheduled PUSCH.

After the UE transmits the random access preamble, the UE attempts to receive its own random access response within a random access response window addressed through system information or a handover command by the eNB, detects a PDCCH masked with the RA-RNTI corresponding to the PRACH, and receives a PDSCH indicated by the detected PDCCH. The random access response information may be transmitted in the form of a MAC packet data unit (PDU), and the MAC PDU may be delivered through the PDSCH.

When the UE successfully receives a random access response having the same random access preamble index/identifier as the random access preamble transmitted to the eNB, the UE stops the monitoring of a random access response. In contrast, if the UE does not receive a random access response message until the random access response window is terminated or does not receive a valid random access response having the same random access preamble index as the random access preamble transmitted to the eNB, the UE considers that the reception of a random access response has failed and then may perform preamble retransmission.

(3) Third Message (Msg 3, Message 3)

When the UE receives a random access response valid therefor, the UE processes each of pieces of information included in the random access response. That is, the UE applies TAC and stores a TC-RNTI. Furthermore, the UE transmits, to the eNB, data stored in the buffer of the UE or newly generated data using an UL grant.

In the case of the initial access of the UE, an RRC connection request generated in the RRC layer and transferred through a CCCH may be transmitted through the third message. In the case of an RRC connection re-establishment procedure, an RRC connection re-establishment request generated in the RRC layer and transferred through a CCCH may be transmitted through the third message. Furthermore, the third message may include an NAS access request message.

The third message needs to include the identity of the UE. A method of including the identity of the UE includes two methods. The first method is for the UE to transmit its own cell identity through an uplink transmission signal corresponding to an UL grant if the UE has had a valid cell identity (C-RNTI) already allocated in a corresponding cell prior to the random access procedure. In contrast, if a valid cell identity has not been allocated to the UE prior to the random access procedure, the UE transmits its own unique identity (e.g., a SAE temporary mobile subscriber identity (S-TMSI) or a random number) through the uplink transmission signal. In general, the unique identity is longer than a C-RNTI.

If the UE has transmitted data corresponding to the UL grant, the UE initiates a contention resolution timer.

(4) Fourth Message (Msg 4, Message 4)

When the eNB receives the C-RNTI of the UE through the third message from the UE, it transmits a fourth message to the UE using the received C-RNTI. In contrast, when the eNB receives a unique identity (i.e., S-TMSI or random number) through the third message from the UE, it transmits the fourth message to the UE using a TC-RNTI allocated to the UE in the random access response. For example, the fourth message may include an RRC connection setup message.

After the UE transmits data including its own identity through the UL grant included in the random access response, the UE waits for the instruction of the eNB for a collision resolution. That is, the UE attempts to receive a PDCCH in order to receive a specific message. A method of receiving the PDCCH also includes two methods. As described above, if the third message transmitted in accordance with the UL grant indicates that its own identity is a C-RNTI, the UE attempts to receive a PDCCH using its own C-RNTI. If the identity is a unique identity (i.e., S-TMSI or random number), the UE attempts to receive a PDCCH using a TC-RNTI included in the random access response. Thereafter, in the former case, when the UE receives a PDCCH through its own C-RNTI before the collision resolution timer expires, the UE determines that the random access procedure has been normally performed and terminates the random access procedure. In the latter case, if the UE has received a PDCCH through a TC-RNTI before the collision resolution timer expires, the UE confirms data delivered through a PDSCH indicated by the PDCCH. If the unique identity of the UE is included in the contents of the data, the UE determines that the random access procedure has been normally performed and terminates the random access procedure. The UE obtains a C-RNTI through the fourth message. Thereafter, the UE and a network transmits and receives UE-dedicated messages using the C-RNTI.

Figure 6:
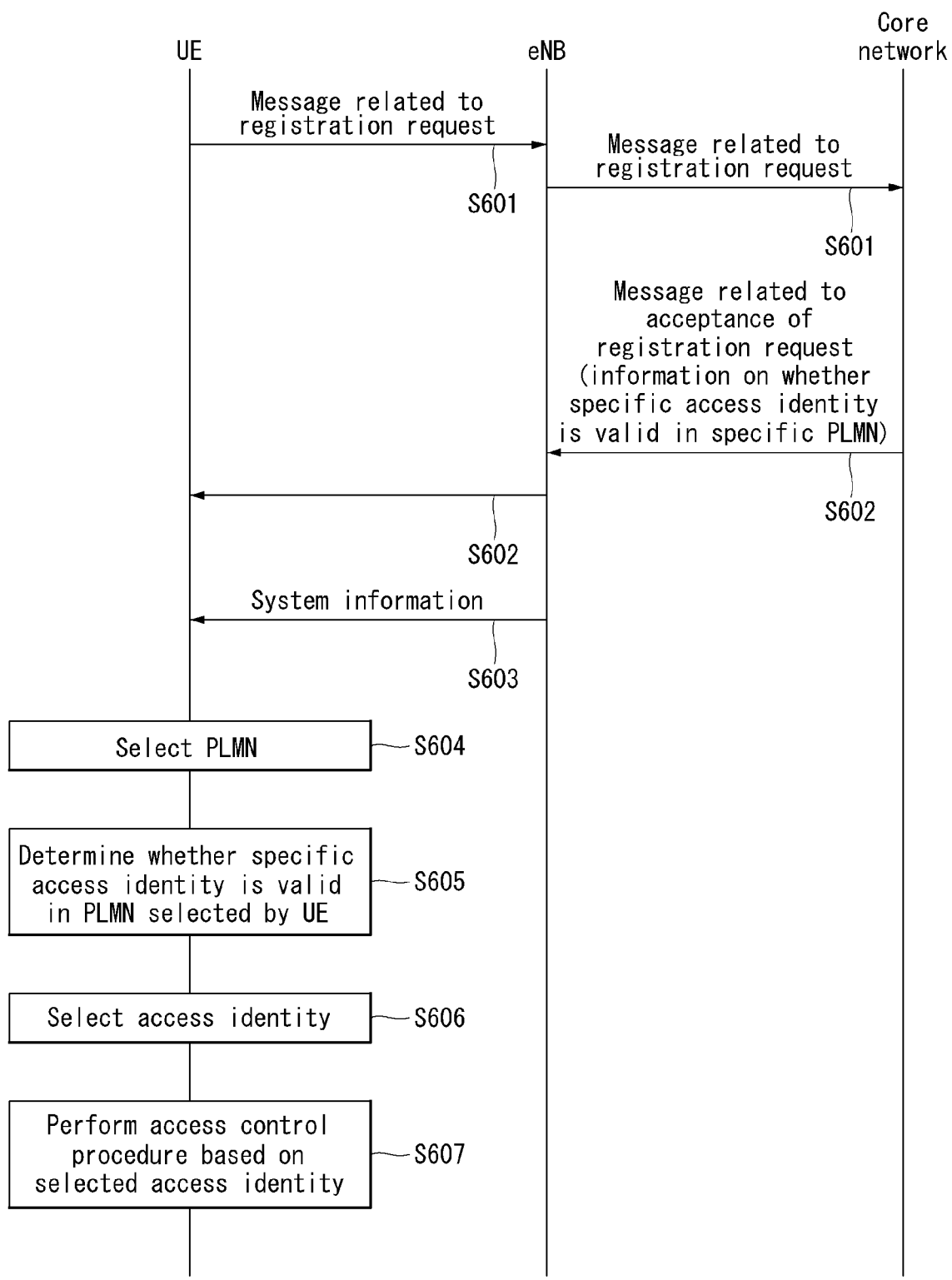
FIG. 6 is a diagram illustrating a method of performing access to a network according to an embodiment of the present invention.

Unlike in the contention-based random access process of FIG. 6, in an operation in a non-contention-based random access process, a random access procedure is terminated by only the transmission of the first message and the transmission of the second message. However, before the UE transmits a random access preamble to the eNB as the first message, the UE is allocated with a random access preamble by the eNB. The UE transmits the allocated random access preamble to the eNB as the first message and receives a random access response from the eNB, thereby terminating the random access procedure.

The random access procedure has been described based on the LTE/LTE-A system, for convenience of description, but the 5G system may support the same/similar procedure.

Registration Procedure

A registration procedure may be used by a UE for initial registration for 5 generation system (5GS) service.

When a UE initiates a registration procedure for initial registration, the UE indicates "initial registration" within a 5GS registration type information element (IE). When the UE initiates a registration procedure for an emergency service, the UE indicates "emergency registration" within the 5GS registration type IE.

A UE in a deregistered state (e.g., 5G mobility management (5GMM)-DEREGISTERED state) starts registration procedure for initial registration by transmitting a REGISTRATION REQUEST message to the AMF in the following situation.

a) When the UE performs initial registration for 5GS service;

b) When the UE performs initial registration for emergency service;

c) When the UE performs initial registration for short message service (SMS) through the NAS;

d) When the UE moves from a global system for mobile communications (GSM) enhanced data rates for GSM evolution (EDGE) radio access network (GERAN) to new generation (NG)-RAN coverage or when the UE moves from a UMTS terrestrial radio access network (UTRAN) to NG-RAN coverage.

Figure 4A:
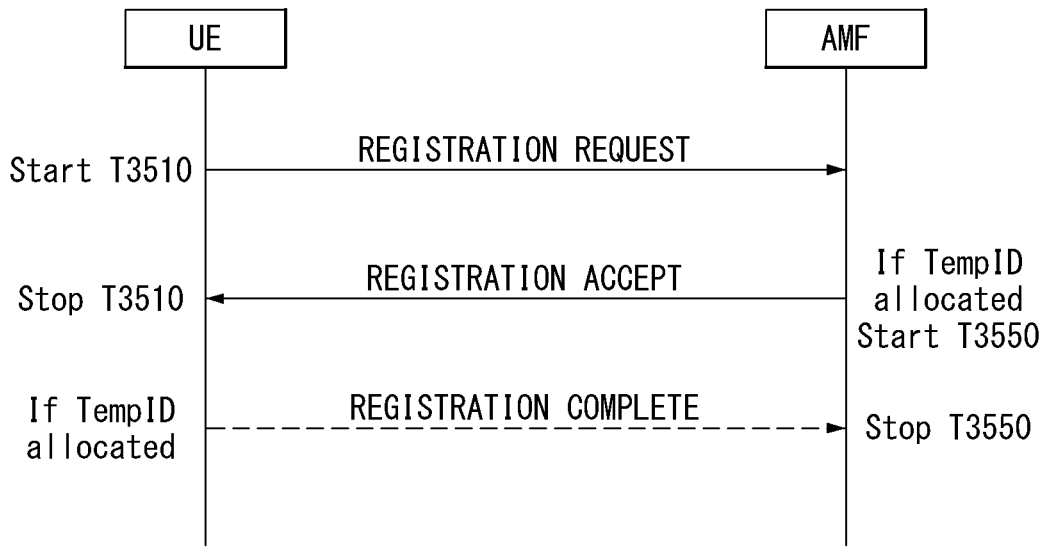
FIGS. 4A and 4B are diagrams illustrating a registration procedure in a wireless communication system to which the present invention may be applied.
Figure 4B:
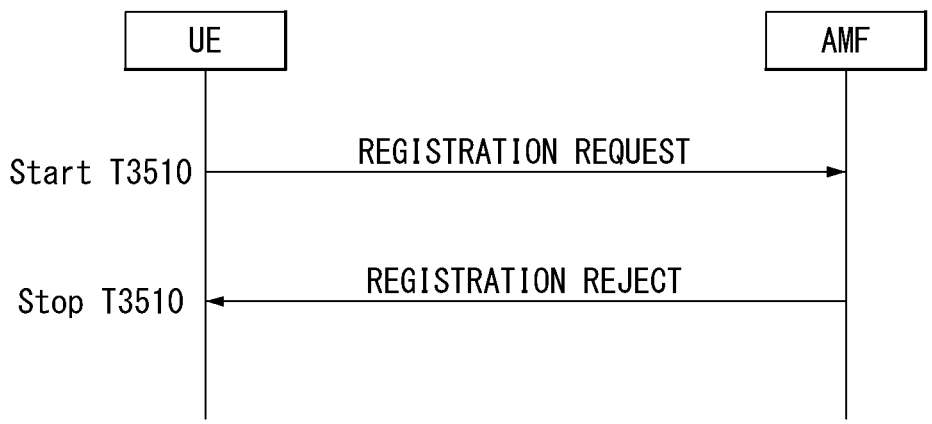

FIGS. 4A and 4B are diagrams illustrating a registration procedure in a wireless communication system to which the present invention may be applied.

FIG. 4A illustrates a procedure when the registration request of a UE is accepted by a network (e.g., AMF). FIG. 4B illustrates a procedure when the registration request of a UE is rejected by a network (e.g., AMF).

Referring to FIGS. 4A and 4B, the UE initiates a registration procedure for initial registration by transmitting a REGISTRATION REQUEST message to the AMF, and starts a timer T3510.

When the registration request is accepted by the network as in FIG. 4A, the AMF transmits a REGISTRATION ACCEPT message to the UE.

In contrast, when the registration request is not accepted by the network as in FIG. 4B, the AMF transmits, to the UE, a REGISTRATION REJECT message including a proper 5GMM cause value. The UE performs a subsequent operation based on a 5GMM cause value received within the REGISTRATION REJECT message.

Method of Controlling Access to Network

Numerous user equipments (UEs) may access a communication system. Several services may be present for the UE. If data communication requests from numerous UEs and numerous services are present, but a network cannot receive the data communication requests of all the UEs and services, the network needs to increase the stability of a system by controlling access requests from the UEs. The reason for this is that if not, a problem in that a communication access request, such as an emergency call, is not properly processed may occur.

Such an access control method is commonly called access control, and the following method is specified in 3GPP TS 22.261 V15.3.0.

6. 22 Unified Access Control

Different criteria are used to determine whether to permit or bar a given access attempt when congestion occurs in a 5G system based on an operator policy, a distribution scenario, a subscriber profile and an available service. The different criteria for access control are associated with an access identity and an access category. In the 5G system, an operator provides a single piece of unified access control for access using such two aspects as criteria.

In the unified access control, each access attempt is divided into one or more access identities and one access category. A UE tests whether an actual access attempt can be performed based on access control information applicable to an access identity and access category, which is associated/matched with the access attempt.

The unified access control additionally supports extensibility that permits a standardized access identity and access category, and supports flexibility that permits an access identity and access category defined by an operator using criteria (e.g., an access identity, subscription information, network slicing that is an example of an access category, an application and an application server) of the operator itself.

Furthermore, when the success of an access attempt is potentially permitted, the use of legacy Access Classes 11-15 is extended. If not, the access attempt may be barred depending on a user type.

According to an operator policy, a 5G system should be able to prevent a UE from accessing a network using barring parameters according to an access identity and access category. An access identity is configured in a UE as listed in Table 1. An access category is defined by combining a condition regarding a UE and an access attempt type listed in Table 2. One or more access identities and one category are selected and are tested for an access attempt.

In a 5G network, the RAN may transmit barring control information (i.e., a list of barring parameters associated with an access identity and access category) within one or more areas.

A UE may determine whether a new specific access attempt can be permitted based on barring parameters received from barring control information and the configuration of the UE.

In the case of several core networks sharing the same RAN, the RAN may individually apply access control to different core networks.

A unified access control framework may be applied to all of UEs that access a 5G core network (CN) using E-UTRA and UEs that access the 5G CN using new radio (NR).

The unified access control framework may be applied to a UE in the RRC idle, RRC inactive or RRC connected state when it starts a new access attempt (i.e., new session request).

A 5G system supports an operator-defined access category that may be exclusively defined by an operator.

The unified access control framework may be applied to a roamer introduced into a PLMN. A serving PLMN may provide a UE with the definition of an operator-defined access category.

Table 1 illustrates access identities.

TABLE 1

| Access identity number | UE configuration |
|---|---|
| 0 | A UE is not configured with any parameter from this table. |
| 1 (NOTE 1) | A UE is configured for multimedia priority service (MPS). |
| 2 (NOTE 2) | A UE is configured for indispensable (mission-critical) service (MCS). |
| 3-10 | Reserved for future use |
| 11 (NOTE 3) | Access Class 11 is configured within a UE. |
| 12 (NOTE 3) | Access Class 12 is configured within a UE. |
| 13 (NOTE 3) | Access Class 13 is configured within a UE. |
| 14 (NOTE 3) | Access Class 14 is configured within a UE. |
| 15 (NOTE 3) | Access Class 15 is configured within a UE. |

NOTE 1:
The access identity 1 is used to provide override based on subscription information of a UE configured for MPS. The subscription information defines whether override can be applied to a UE corresponding to one of the following categories.
a) A UE configured for MPS;
b) A UE configured for MPS and located within a PLMN listed as an operator-defined PLMN selector list or as the most preferred PLMN list of the country where the UE roams within a home PLMN (HPLMN) thereof or PLMNs equivalent to their HPLMNs;
c) A UE configured for MPS and located within an their HPLMNs or a PLMN equivalent to the HPLMN.
NOTE 2:
The access identity 2 is used to provide override based on subscription information of a UE configured for MPS. The subscription information defines whether override can be applied to a UE corresponding to one of the following categories.
a) A UE configured for MCS;
b) A UE configured for MCS and located within a PLMN listed as an operator-defined PLMN selector list or as the most preferred PLMN list of the country where the UE roams within their HPLMNs or PLMNs equivalent to their HPLMNs;
c) A UE configured for MCS and located within their HPLMNs or PLMNs equivalent to the HPLMNs.
NOTE 3:
The access identities 11 and 15 are valid within an HPLMN if an equivalent HPLMN (EHPLMN) list is not present and are valid within a given EHPLMN if not. The access identities 12, 13 and 14 are valid only within a home PLMN and visited PLMNs (VPLMNs) within a home country. To this end, the home country is defined as the country of the mobile country code (MCC) of an IMSI.

The access identity may be barred any time.
Table 2 illustrates access categories.

TABLE 2

| Access category number | Conditions related to UE | Access attempt type |
|---|---|---|
| 0 | All conditions | Mobile Originating (MO) Signaling due to paging |
| 1 (NOTE 1) | A UE is configured for delay tolerant service and subject to access control for Access Category 1, which is judged based on relation of UE's HPLMN and the selected PLMN | All access attempts except emergency |
| 2 | All conditions | Emergency access attempt |
| 3 | All except for the conditions in Access Category 1 | MO signalling resulting from other than paging |
| 4 | All except for the conditions in Access Category 1 | Multimedia telephony (MMTEL) voice |
| 5 | All except for the conditions in Access Category 1 | MMTEL video |
| 6 | All except for the conditions in Access Category 1 | Short Messaging Service (SMS) |
| 7 | All except for the conditions in Access Category 1 | MO data that do not belong to any other Access Categories |
| 8-31 | | Reserved standardized access category |
| 32-63 (NOTE 2) | All conditions | Access attempt type based on operator classification |

NOTE 1:
A barring parameter for Access Category 1 is accompanied by information that defines whether the access category is applied to UEs within one of the following categories:
a) UEs configured for delay tolerant service;

b) UEs configured for delay tolerant service and located neither in their HPLMN nor in PLMNs equivalent to them;

c) UEs configured for delay tolerant service and located neither in a PLMN listed as the most preferred PLMN of the country where the UE is roaming in an operator-defined PLMN selector list on the SIM/USIM, nor in their HPLMNs nor in a PLMN equivalent to their HPLMNs.
NOTE 2:
When access attempts in an access category based on operator classification and a standardized access category can be categorized and the standardized access category is neither 0 nor 2, a UE applies the access category based on the operator classification. When access attempts in an access category based on operator classification and a standardized access category can be categorized and the standardized access category is 0 or 2, a UE applies the standardized access category.

In Table 1 and Table 2, an MPS user (i.e., a UE configured for MPS) and an MCS user (i.e., a UE configured for MCS) are configured as UEs/users having an object of special use. For example, an MPS user and an MCS user may be configured for a user who is responsible for public safety.

However, in the current method, the following problems may occur due to an access identity.

Referring to Table 1, a), b) and c) categories are as follows.
- a) a UE configured for MPS/MCS
- b) a UE configured for MPS/MCS and located within a PLMN listed as an operator-defined PLMN selector list or as the most preferred PLMN list of the country where the UE roams within their HPLMNs or a PLMN equivalent to their HPLMNs
- c) a UE configured for MPS/MCS and located within their HPLMNs or a PLMN equivalent the HPLMNs In this case, the case of a) is used to permit more MCS/MPS UEs than the case of b). Furthermore, the case of b) is used to permit more MCS/MPS UEs than the case of c).

However, the current standard is not clear in the following scenario:

Scenario 1: an MPS/MCS UE moves to a different country and there are several PLMNs agreed with an HPLMN.

In this case, a UE of the case of b) is not permitted to use an access identity for MPS/MCS.

Scenario 2: MPS/MCS services are used within a country A. A UE 1 is configured as an MPS/MCS UE. Furthermore, MPS/MCS services are not used within a country B.

In this case, whether the UE 1 may use an access identity for MPS/MCS is not clear.

Scenario 3: MPS/MCS services are used within an operator K within a country C. Furthermore, the operator K determines to not provide access priority to an MPS/MCS user from a PLMN/country where an agreement has not been made.

In this case, a UE of the case of a), b), c) is not permitted to use an access identity for MPS/MCS.

In order to solve such problems, the present invention proposes a method of controlling a UE's access to a network.

In accordance with an embodiment of the present invention, when a network (or operator) grants a specific service (or an access identity related to a specific service) to a given UE, the network delivers information regarding that an access identity related to a corresponding service is valid in which PLMN. In other words, the network provides information on whether a specific access identity is valid (or available) in a specific PLMN.

When a UE is configured with a specific service (or an access identity related to a specific service), the UE receives, from a network, information regarding that an access identity related to the service configured for the UE is valid in which PLMN. In this case, when the UE subsequently stays in a specific PLMN (i.e., when the UE attempts to access a cell supporting the corresponding PLMN), the UE checks whether the corresponding PLMN has been included in information (i.e., information on the PLMN whose access identity related to the service configured for the UE is valid) previously received from the network.

If the corresponding PLMN is included in the information (i.e., information on the PLMN whose access identity related to the service configured for the UE is valid) previously received from the network, the UE uses the access identity related to the specific service configured therefor in order to access the corresponding PLMN (or a cell supporting the corresponding PLMN). However, if the corresponding PLMN is not included in the information (i.e., information on the PLMN whose access identity related to the service configured for the UE is valid) previously received from the network, the UE does not use the access identity related to the specific service configured therefor in order to access the corresponding PLMN (or a cell supporting the corresponding PLMN).

For example, when a network (or operator) grants MPS/MCS to a given UE, the network delivers, to the UE, information on whether MPS/MCS (or an access identity for MPS/MCS) is valid in which PLMN.

When the UE is configured for MPS/MCS, the UE may receive information on whether an access identity for MPS/MCS is valid in which PLMN. In this case, when the UE subsequently stays in a specific PLMN (i.e., when the UE attempts to access a cell supporting the corresponding PLMN), the UE checks whether the corresponding PLMN is included in information (i.e., information on the PLMN whose access identity for MPS/MCS configured for the UE is valid) previously received from the network.

If the corresponding PLMN is included in the information (i.e., information on the PLMN whose access identity for MPS/MCS configured for the UE is valid) previously received from the network, the UE uses the access identity for MPS/MCS configured therefor in order to access the corresponding PLMN (or a cell supporting the corresponding PLMN). However, if the corresponding PLMN is not included in the information (i.e., information on the PLMN whose access identity for MPS/MCS configured for the UE is valid) previously received from the network, the UE does not use the access identity for MPS/MCS configured therefor in order to access the corresponding PLMN (or a cell supporting the corresponding PLMN).

Table 3 illustrates access categories according to an embodiment of the present invention.

TABLE 3

| Access identity number | UE configuration |
| --- | --- |
| 0 | A UE is not configured with any parameter from this table |
| 1 (NOTE 1) | A UE is configured for MPS. |
| 2 (NOTE 2) | A UE is configured for MCS |
| 3-10 | Reserved for future use |
| 11 (NOTE 3) | Access Class 11 is configured within a UE. |
| 12 (NOTE 3) | Access Class 12 is configured within a UE. |
| 13 (NOTE 3) | Access Class 13 is configured within a UE. |
| 14 (NOTE 3) | Access Class 14 is configured within a UE. |
| 15 (NOTE 3) | Access Class 15 is configured within a UE. |

TABLE 3-continued

| Access identity number | UE configuration |
|---|---|

NOTE 1:
The access identity us used by a UE configured for MPS within a PLMN whose configuration is valid (i.e., the access identity 1 is supported).
1 > When a UE is configured for MPS, when a UE enters a cell or is powered on within a cell, or when a UE performs reselection,
1 > the UE receives system information from the cell.
1 > the UE checks whether which PLMN is supported in the cell.
1 > If the UE has not yet selected a PLMN, the UE selects one PLMN within PLMNs available within the cell. Or, if the UE has been registered with a PLMN, the UE checks whether the registered PLMN is supported within the cell.
1 > When a UE is necessary to access a network within a cell,
1 > the UE checks whether the UE has been configured for MPS.
2 > if the UE has been configured for MPS, the UE checks whether the UE has been configured with a PLMN list whose MPS is valid.
3 > if a PLMN list whose MPS is valid is present, the UE checks whether the selected PLMN has been selected within a PLMN list whose MPS is valid
4 > if a current PLMN is within the list, the UE selects/uses the access identity 1.
4 > if a current PLMN is not within the list, the UE does not select/use the access identity 1.
3 > if a PLMN list whose MPS is valid is not present, the UE selects/uses the access identity 1.
2 > if the UE has not been configured for MPS, the UE does not select/use the access identity 1. The procedure for the UE configured for MPS may be likewise applied to a UE configured for MCS.
NOTE 2:
the access identity 2 is used by a UE configured for MCS within a PLMN whose configuration is valid (i.e., the access identity 2 is supported).
1 > When a UE is configured for MCS, when a UE enters a cell or is powered on within a cell, or when a UE performs reselection,
1 > the UE receives system information from the cell.
1 > the UE checks whether which PLMN is supported in the cell.
1 > If the UE has not yet selected a PLMN, the UE selects one PLMN within PLMNs available within the cell. Or, if the UE has been registered with a PLMN, the UE checks whether the registered PLMN is supported within the cell.
1 > When a UE is necessary to access a network within a cell,
1 > the UE checks whether the UE has been configured for MCS.
2 > if the UE has been configured for MCS, the UE checks whether the UE has been configured with a PLMN list whose MCS is valid.
3 > if a PLMN list whose MCS is valid is present, the UE checks whether the selected PLMN has been selected within a PLMN list whose MCS is valid.
4 > if a current PLMN is within the list, the UE selects/uses the access identity 2.
4 > if a current PLMN is not within the list, the UE does not select/use the access identity 2.
3 > if a PLMN list whose MCS is valid is not present, the UE selects/uses the access identity 2.
2 > if the UE has not been configured for MCS, the UE does not select/use the access identity 2.
NOTE 3:
the access identities 11 and 15 are valid within a home PLMN (HPLMN). If an equivalent HPLMN (EHPLMN) list is not present, the access identities 11 and 15 are valid within a home PLMN (HPLMN). If not, the access identities 11 and 15 are valid within a given EHPLMN. The access identities 12, 13 and 14 are valid only within a home PLMN and VPLMNs within a home country. To this end, the home country is defined as a country of the MCC part of the IMSI.

A network may deliver a configuration (i.e., information on a PLMN whose specific access identity (e.g., access identity for MPS/MCS) is valid) to a UE using the following method or a similar method.

For example, in order to indicate that the ATTACH REQUEST of a UE has been accepted, an ATTACH ACCEPT message transmitted from a network to the UE may be used.

Table 4 illustrates content of the ATTACH ACCEPT message.

TABLE 4

| IEI | Information element | Type/reference | Existence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Attach accept message identity | Message type 9.8 | M | V | 1 |
| | EPS attach result | EPS attach result 9.9.3.10 | M | V | 1/2 |
| | Spare half octet | Spare half octet 9.9.2.9 | M | V | 1/2 |
| | T3412 value (T3412 value) | General Packet Radio Service (GPRS) timer 9.9.3.16 | M | V | 1 |
| | Tracking area identity (TAI) list | Tracking area identity list 9.9.3.33 | M | LV | 7-97 |
| | ESM message container | ESM message container 9.9.3.15 | M | LV-E | 5-n |
| 50 | Globally Unique Temporary Identifier (GUTI) | EPS mobile identity 9.9.3.12 | O | TLV | 13 |

TABLE 4-continued

| IEI | Information element | Type/reference | Existence | Format | Length |
|---|---|---|---|---|---|
| 13 | Location area identification | Location area identification 9.9.2.2 | O | TV | 6 |
| 23 | Mobile Station (MS) identity | Mobile identity 9.9.2.3 | O | TLV | 7-10 |
| 53 | EPS Mobility Management (EMM) cause | EMM cause 9.9.3.9 | O | TV | 2 |
| 17 | T3402 value (T3402 value) | GPRS timer 9.9.3.16 | O | TV | 2 |
| 59 | T3423 value (T3423 value) | GPRS timer 9.9.3.16 | O | TV | 2 |
| 4A | Equivalent PLMNs | the PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3-4 |
| F- | Additional update result | Additional update result 9.9.3.0A | O | TV | 1 |
| 5E | T3412 extended value | GPRS timer 3 9.9.3.16B | O | TLV | 3 |
| 6A | T3324 value | GPRS timer 2 9.9.3.16A | O | TLV | 3 |
| 6E | Extended Discontinuous Reception (DRX) parameters | Extended DRX parameters 9.9.3.46 | O | TLV | 3 |
| 65 | Dedicated Core Network (DCN)-ID | DCN-ID 9.9.3.48 | O | TLV | 4 |
| E- | Short Message Service (SMS) services status | SMS services status 9.9.3.4B | O | TV | 1 |
| D- | Non-3GPP Network (NW) provided policies | Non-3GPP NW provided policies 9.9.3.49 | O | TV | 1 |
| 6B | T3448 value | GPRS timer 2 9.9.3.16A | O | TLV | 3 |
| C- | Network policy | Network policy 9.9.3.52 | O | TV | 1 |
|  | MPS configuration | MPS configuration |  |  |  |

As illustrated in Table 4, the Attach Accept message may include an MPS configuration IE. The IE may indicate whether a UE is permitted to operate as an MPS user and/or a PLMN in which a UE may operate as an MPS user.

Table 4 illustrates only the MPS configuration, but this is merely an example and the present invention is not limited thereto. For example, the Attach Accept message may include an MCS configuration IE. The IE may indicate whether a UE is permitted to operate as an MCS user and/or a PLMN in which a UE may operate as an MCS user.

Furthermore, Table 4 illustrates a case where information (e.g., MPS configuration, MCS configuration) on a PLMN in which the use of a specific access identity is permitted is delivered to a UE within the ATTACH ACCEPT message, but the present invention is not limited thereto. For example, the registration message of a 5G system (i.e., a message related to the acceptance of a registration request from a UE, for example, a REGISTRATION ACCEPT message) may be used or an open mobile alliance (OMA) device management (DM) configuration may be used.

Figure 5:
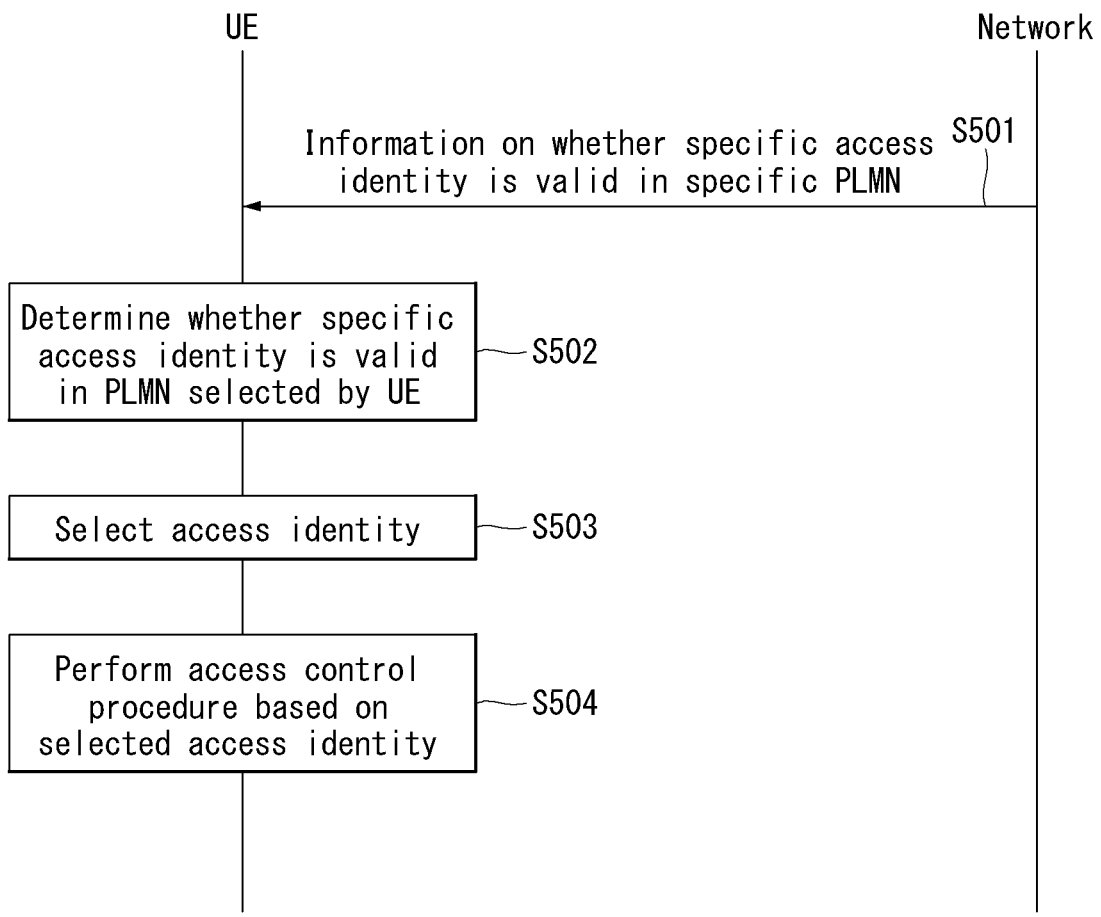
FIG. 5 is a diagram illustrating a method of performing access to a network according to an embodiment of the present invention.

FIG. 5 is a diagram illustrating a method of performing access to a network according to an embodiment of the present invention.

Referring to FIG. 5, a UE receives information (hereafter referred to as "first information") on whether a specific access identity is valid (or available) in a specific PLMN from a network (e.g., the network may be a 5G system. Furthermore, the network may correspond to a specific entity (e.g., AMF) within the network) (S501).

The first information on whether a specific access identity is valid in a specific PLMN may indicate whether one or more specific access identities are valid (available) in what kind of one or more PLMNs (e.g., HPLMN, EHPLMN, and VPLMN).

When the UE attempts to select the PLMN and access a wireless communication network (i.e., corresponding PLMN), the UE determines whether the specific access identity is valid in the PLMN selected by the UE based on the first information (S502).

That is, the first information indicates that the specific access identity is valid in which PLMN(s). Accordingly, the UE determines whether the PLMN selected by the UE belongs to a PLMN(s) included in the first information.

In this case, if the UE does not receive second information different from the first information on whether the specific access identity is valid in the specific PLMN, the UE may determine whether the specific access identity is valid in the PLMN selected by the UE based on the first information. For example, after the first information indicating that an access identity 1 for MPS (or access identity 2 for MCS) is valid (available) in a specific PLMN is received, unless information indicating that the access identity 1 for MPS (or access identity 2 for MCS) is not valid (unavailable) in the corresponding PLMN is received, the UE may determine that the access identity 1 for MPS (or access identity 2 for MCS) is valid (available) in the corresponding PLMN.

The UE selects an access identity (i.e., access identity associated with an access attempt) based on a determination of step S502 (S503).

In this case, when the UE determines that the specific access identity is valid in the PLMN selected by the UE at step S502, the UE may select the corresponding specific access identity. For example, when an access identity 1 for MPS (or access identity 2 for MCS) is valid (available) in the PLMN selected by the UE, the UE may select the corresponding access identity 1 (or access identity 2 for MCS).

In contrast, when the UE determines that the specific access identity is not valid in the PLMN selected by the UE at step S502, the UE may select an access identity other than the corresponding specific access identity.

Furthermore, if a UE has been configured for a specific service, when an access identity for the corresponding specific service is valid (available) in a PLMN selected by the UE, the UE may select the access identity for the corresponding specific service. For example, if a UE is configured for MPS and an access identity for MPS is valid in a PLMN selected by the UE, the UE may select the access identity for MPS. Furthermore, if a UE is configured for MCS and an access identity for MCS is valid in a PLMN selected by the UE, the UE may select the access identity for MCS.

The UE performs an access control procedure based on the selected access identity (S504).

In this case, when the access attempt is barred by performing the access control procedure, the access of the UE to the network is terminated.

FIG. 6 is a diagram illustrating a method of performing access to a network according to an embodiment of the present invention.

Referring to FIG. 6, a UE transmits a message (e.g., ATTACH REQUEST message or REGISTRATION REQUEST message), related to a registration request, to a core network (e.g., the core network may be a 5G system. Furthermore, the core network may correspond to a specific entity (e.g., AMF) within the network) through a base station (S601).

For example, the NAS layer of the UE may deliver, to the RRC layer of the UE, an NAS message (e.g., ATTACH REQUEST message or REGISTRATION REQUEST message) related to the registration request. The RRC layer of the UE may transmit an RRC message, including an NAS message, to the base station. The base station may transmit an N2 message, including the NAS message, to the AMF.

The UE receives a message (e.g., ATTACH ACCEPT message or REGISTRATION ACCEPT message), related to the acceptance of the registration request, through the base station from the core network (S602).

For example, the AMF may transmit an N2 message, including an NAS message (e.g., ATTACH ACCEPT message or REGISTRATION ACCEPT message) related to the acceptance of the registration request, to the base station. Furthermore, the base station may transmit, to the UE, an RRC message including an NAS message. The RRC layer of the UE may deliver, to the NAS layer of the UE, the received NAS message including the RRC message.

In this case, the message (e.g., ATTACH ACCEPT message or REGISTRATION ACCEPT message) related to the acceptance of the registration request includes information (hereinafter referred to as "first information") on whether a specific access identity is valid (or available) in a specific PLMN.

The first information on whether a specific access identity is valid in a specific PLMN may indicate whether one or more specific access identities are valid in what kind of one or more PLMNs (e.g., HPLMN, EHPLMN and VPLMN).

When the UE enters a cell, when the UE is powered on within a cell or when the UE performs cell reselection, the UE receives system information broadcasted by the base station (S603).

For example, the RRC layer of the UE may receive system information message broadcasted to the base station. Furthermore, the RRC layer may deliver, to the NAS layer of the UE, PLMN information supported (available) within a cell.

In this case, the system information includes PLMN information supported within the corresponding cell. Accordingly, the UE checks which PLMN is supported within the cell.

If the UE has not yet selected a PLMN, the UE selects one of PLMNs available within the cell (S604).

If the UE has already been registered with a specific PLMN, the UE checks whether the registered PLMN is supported within a corresponding cell. In this case, if the registered PLMN is supported within the corresponding cell, step S603 may be omitted. If the registered PLMN is not supported within the corresponding cell, however, the UE may select a new PLMN.

For example, the NAS layer of the UE may select a PLMN based on information on PLMNs available within a cell, which has been received from the RRC layer of the UE.

When the UE attempts to access a wireless communication network (i.e., selected PLMN), the UE determines whether a specific access identity is valid in a PLMN selected by the UE based on the first information (S605).

That is, the first information indicates whether a specific access identity is valid in which PLMN(s), so the UE determines whether a PLMN selected by the UE belongs to a PLMN(s) included in the first information.

For example, the NAS layer of the UE may determine whether a PLMN selected by the UE belongs to a PLMN(s) included in the first information based on the first information included in the message related to the acceptance of the registration request.

In this case, the UE may determine whether a specific access identity is valid in the PLMN selected by the UE based on the first information unless second information different from the first information on whether the specific access identity is valid in a specific PLMN is received. For example, after the first information indicating that an access identity 1 for MPS (or access identity 2 for MCS) is valid (available) in a specific PLMN is received, unless information indicating that the access identity 1 for MPS (or access identity 2 for MCS) is not valid (unavailable) in the corresponding PLMN is received, the UE may determine that the access identity 1 for MPS (or access identity 2 for MCS) is valid (available) in the corresponding PLMN.

The UE selects an access identity (i.e., access identity associated with an access attempt) based on a determination of step S605 (S606).

For example, the NAS layer of the UE may select an access identity (i.e., access identity associated with an access attempt) based on a determination of step S605. Furthermore, the NAS layer may deliver the selected access identity to the RRC layer of the UE.

In this case, when the UE determines that a specific access identity is valid in a PLMN selected by the UE at step S605, the UE may select the corresponding specific access identity. For example, when an access identity 1 for MPS (or access identity 2 for MCS) is valid in a PLMN selected by the UE, the UE may select the corresponding access identity 1 (or access identity 2 for MCS).

In contrast, when the UE determines that a specific access identity is not valid in a PLMN selected by the UE at step S605, the UE may select an access identity other than the corresponding specific access identity.

Furthermore, if the UE has been configured for a specific service, when an access identity for the corresponding specific service is valid in a PLMN selected by the UE, the UE may select the access identity for the corresponding specific service. For example, if the UE is configured for MPS and an access identity for MPS is valid in a PLMN selected by the UE, the UE may select the access identity for MPS. Furthermore, if the UE is configured for MCS and an access identity for MCS is valid in a PLMN selected by the UE, the UE may select the access identity for MCS.

The UE performs an access control procedure based on the selected access identity (S607).

For example, the RRC layer of the UE may perform the access control procedure based on the access identity received from the NAS layer of the UE. The RRC layer of the UE may be aware of access barring parameters for the access identity by receiving system information from the base station. Accordingly, when the RRC layer of the UE receives a request for an RRC connection along with the access identity from the NAS layer of the UE, the RRC layer of the UE may perform a unified access control procedure using the received access identity. If an access attempt is barred based on an unified access control procedure, the RRC connection procedure of the UE is terminated.

General apparatus to which the present invention may be applied

Figure 7:
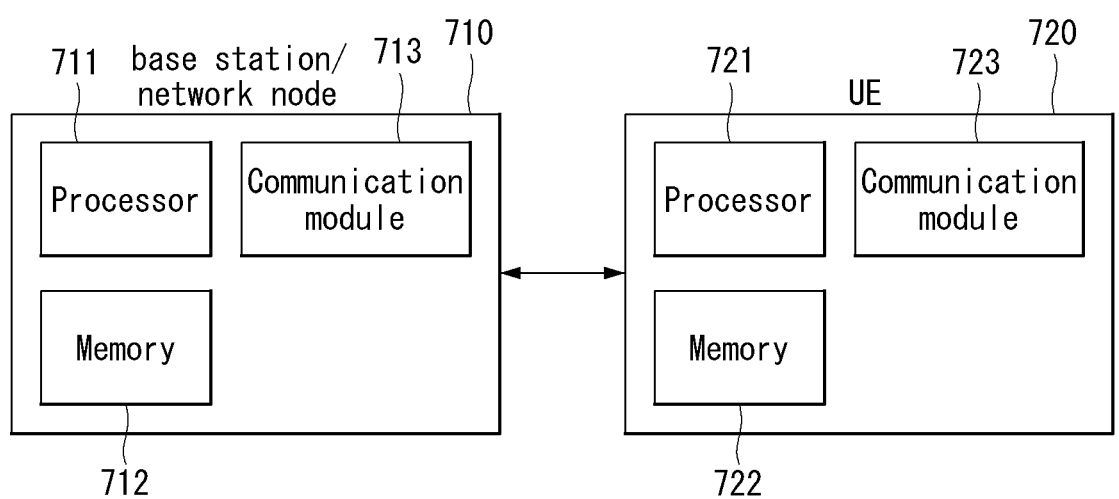
FIG. 7 illustrates a block diagram of a communication apparatus according to an embodiment of the present invention.

FIG. 7 illustrates a block diagram of a communication apparatus according to an embodiment of the present invention.

Referring to FIG. 7, the wireless communication system includes a network node 710 and multiple UEs 720.

The network node 710 includes a processor 711, memory 712 and a transceiver 713. The processor 711 implements the functions, processes and/or methods proposed in FIGS. 1 to 6. The layers of a wired/wireless interface protocol may be implemented by the processor 711.

The memory 712 is connected to the processor 711 and stores various types of information for driving the processor 711. The transceiver 713 is connected to the processor 711 and transmits and/or receives a wired/wireless signal. The network node 710 may correspond to a base station (eNB, ng-eNB and/or gNB), an MME, an AMF, an SMF, an HSS, an SGW, a PGW, an SCEF or an SC S/AS, for example. Specifically, if the network node 710 is a base station (eNB, ng-eNB and/or gNB), the transceiver 713 may include a radio frequency (RF) unit for transmitting/receiving radio signals.

The UE 720 includes a processor 721, memory 722 and a transceiver (or RF unit) 723. The processor 721 implements the functions, processes and/or methods proposed in FIGS. 1 to 6. The layers of a wired/wireless interface protocol may be implemented by the processor 721. Specifically, the processor may include an NAS layer and an AS layer. The memory 722 is connected to the processor 721 and stores various types of information for driving the processor 721. The transceiver 723 is connected to the processor 721 and transmits and/or receives a radio signal.

The memory 712, 722 may be positioned inside or outside the processor 711, 721 and may be connected to the processor 711, 721 by various well-known means. Furthermore, the network node 710 (in the case of a base station) and/or the UE 720 may have a single antenna or multiple antennas.

The processor 721 of the UE 720 receives information (hereinafter referred to as "first information") on whether a specific access identity is valid (or available) in a specific PLMN from the network node 710.

The first information on whether a specific access identity is valid in a specific PLMN may indicate whether one or more specific access identities are valid in what kind of one or more PLMNs (e.g., HPLMN, EHPLMN and VPLMN).

When the processor 721 of the UE 720 attempts to access a wireless communication network, it determines whether a specific access identity is valid in a PLMN selected by the processor 721 of the UE 720 based on the first information.

That is, the first information indicates whether a specific access identity is valid in which PLMN(s), so the processor 721 of the UE 720 determines whether the selected PLMN belongs to a PLMN(s) included in the first information.

In this case, the processor 721 of the UE 720 may determine whether a specific access identity is valid in the PLMN selected by the UE based on the first information unless second information different from the first information on whether the specific access identity is valid in a specific PLMN is received.

The processor 721 of the UE 720 selects an access identity (i.e., access identity associated with an access attempt) based on the determination.

In this case, when the processor determines that a specific access identity is valid in the selected PLMN, the processor 721 of the UE 720 may select the corresponding specific access identity. However, when the processor determines that a specific access identity is not valid in the selected PLMN, the processor 721 of the UE 720 may select an access identity other than the corresponding specific access identity.

The processor 721 of the UE 720 performs an access control procedure based on the selected access identity. In this case, the access of the UE to the network is terminated when the access attempt is barred by performing the access control procedure.

Figure 8:
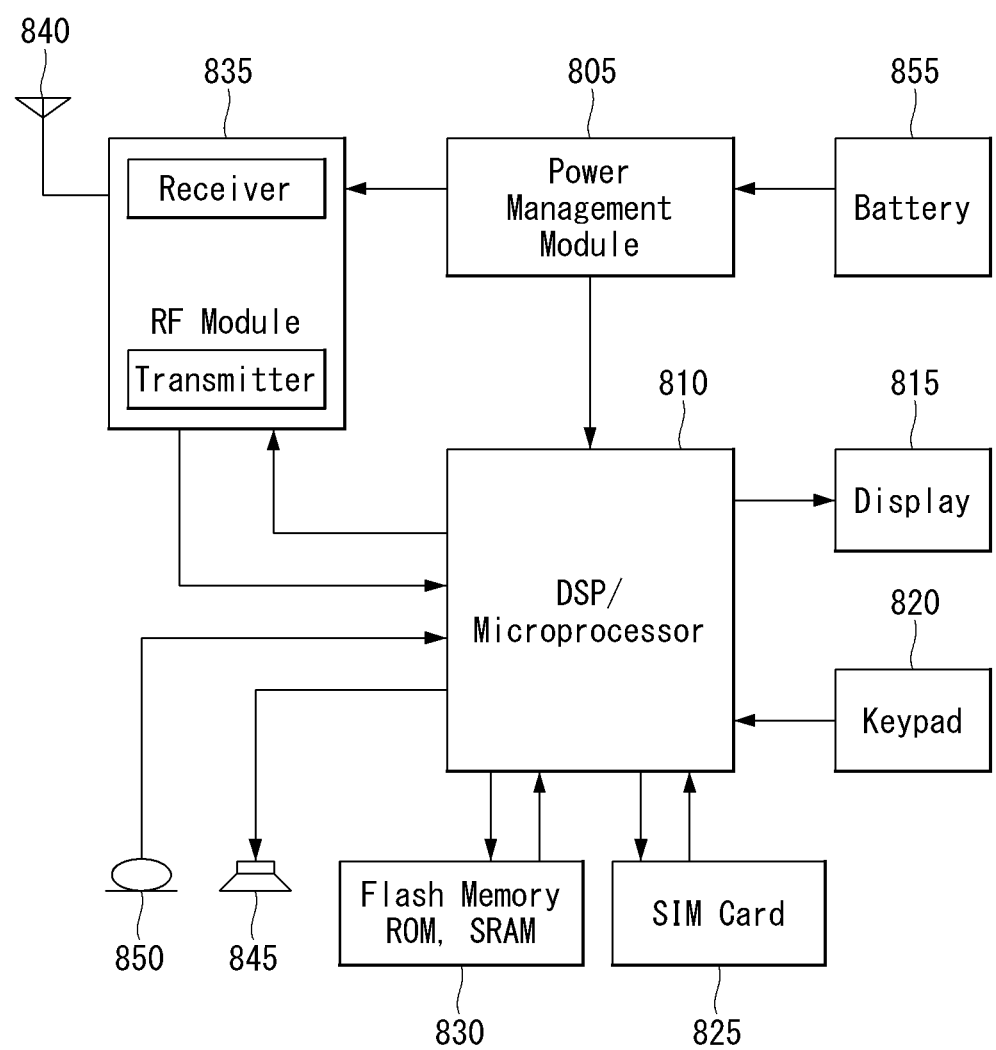
FIG. 8 illustrates a block diagram of a communication apparatus according to an embodiment of the present invention.

FIG. 8 illustrates a block diagram of a communication apparatus according to an embodiment of the present invention.

Specifically, FIG. 8 is a diagram showing the UE of FIG. 7 more specifically.

Referring to FIG. 8, the UE may include a processor (or digital signal processor (DSP)) 810, an RF module (or RF unit) 835, a power management module 805, an antenna 840, a battery 855, a display 815, a keypad 820, a memory 830, a subscriber identification module (SIM) card 825 (this element is optional), a speaker 845, and a microphone 850. The UE may further include a single antenna or multiple antennas.

The processor 810 implements the function, process and/ or method proposed in FIGS. 1 to 6. The layers of a radio interface protocol may be implemented by the processor 810.

The memory 830 is connected to the processor 810, and stores information related to the operation of the processor 810. The memory 830 may be positioned inside or outside the processor 810 and may be connected to the processor 810 by various well-known means.

A user inputs command information, such as a telephone number, by pressing (or touching) a button of the keypad 820 or through voice activation using the microphone 850, for example. The processor 810 receives such command information and performs processing so that a proper function, such as making a phone call to the telephone number, is performed. Operational data may be extracted from the SIM card 825 or the memory 830. Furthermore, the processor 810 may recognize and display command information or driving information on the display 815, for convenience sake.

The RF module 835 is connected to the processor 810 and transmits and/or receives RF signals. The processor 810 delivers command information to the RF module 835 so that the RF module 835 transmits a radio signal that forms voice communication data, for example, in order to initiate communication. The RF module 835 includes a receiver and a transmitter in order to receive and transmit radio signals. The antenna 840 functions to transmit and receive radio signals. When a radio signal is received, the RF module 835 delivers the radio signal so that it is processed by the processor 810, and may convert the signal into a baseband. The processed signal may be converted into audible or readable information output through the speaker 845.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The present invention has been illustrated as being applied to an example in which it has been applied to the 3GPP LTE/LTE-A system or a 5 generation (5G) system, but may be applied to various other wireless communication systems.

What is claimed is:

1. A method of performing access to a network by a user equipment (UE) in a wireless communication system, the method comprising:
determining one or more public land mobile networks (PLMNs) which are available in a cell, based on system information related to the cell;
selecting a PLMN among the one or more PLMNs;
determining, among pre-configured access identities, a specific access identity to access the selected PLMN; and
performing an access control procedure based on the specific access identity,
wherein the specific access identity is determined based on:
determining whether a first access identity related to a multimedia priority service (MPS) or a second access identity related to a mission critical service (MCS) is valid for the selected PLMN.

2. The method of claim 1,
wherein, based on a determination that the first access identity related to the MPS is valid for the selected PLMN, the specific access identity is determined as the first access identity related to the MPS.

3. The method of claim 1,
wherein, based a determination that the second access identity related to the MCS is valid for the selected PLMN, the specific access identity is determined as the second access identity related to the MCS.

4. The method of claim 1,
wherein, based on a determination that the first access identity related to the MPS and the second access identity related to the MCS are not valid for the selected PLMN, the specific access identity is, among the pre-configured access identities, determined as an access identity other than the first access identity and the second access identity.

5. A user equipment (UE) configured to perform access to a network in a wireless communication system, the UE comprising:
a transceiver configured to transmit and receive radio signals; and
at least one processing apparatus configured to control the transceiver,
wherein the at least one processing apparatus is further configured to:
determine one or more public land mobile networks (PLMNs) which are available in a cell, based on system information related to the cell;
select a PLMN among the one or more PLMNs;
determine, among pre-configured access identities, a specific access identity to access the selected PLMN; and
perform an access control procedure based on the specific access identity,
wherein the specific access identity is determined based on:
determining whether a first access identity related to a multimedia priority service (MPS) or a second access identity related to a mission critical service (MCS) is valid for the selected PLMN.

6. The UE of claim 5,
wherein, based on a determination that the first access identity related to the MPS and the second access identity related to the MCS are not valid for the selected PLMN, the specific access identity is, among the pre-configured access identities, determined as an access identity other than the first access identity and the second access identity.

7. The UE of claim 5,
wherein, based on a determination that the first access identity related to the MPS is valid for the selected PLMN, the specific access identity is determined as the first access identity related to the MPS.

8. The UE of claim 5,
wherein, based a determination that the second access identity related to the MCS is valid for the selected PLMN, the specific access identity is determined as the second access identity related to the MCS.

9. At least one non-transitory computer-readable media storing instructions that, when executed by at least one processor, perform operations for a user equipment (UE), the operations comprising:
 determining one or more public land mobile networks (PLMNs) which are available in a cell, based on system information related to the cell;
 selecting a PLMN among the one or more PLMNs;
 determining, among pre-configured access identities, a specific access identity to access the selected PLMN; and
 performing an access control procedure based on the specific access identity,
 wherein the specific access identity is determined based on:
  determining whether a first access identity related to a multimedia priority service (MPS) or a second access identity related to a mission critical service (MCS) is valid for the selected PLMN.

10. The at least one non-transitory computer-readable media of claim 9,
wherein, based on a determination that the first access identity related to the MPS is valid for the selected PLMN, the specific access identity is determined as the first access identity related to the MPS.

11. The at least one non-transitory computer-readable media of claim 9,
wherein, based a determination that the second access identity related to the MCS is valid for the selected PLMN, the specific access identity is determined as the second access identity related to the MCS.

12. The at least one non-transitory computer-readable media of claim 9,
wherein, based on a determination that the first access identity related to the MPS and the second access identity related to the MCS are not valid for the selected PLMN, the specific access identity is, among the pre-configured access identities, determined as an access identity other than the first access identity and the second access identity.

* * * * *